(12) United States Patent
Falardeau et al.

(10) Patent No.: US 9,700,856 B2
(45) Date of Patent: Jul. 11, 2017

(54) STIRRING BLADE AND SUPPORT PLATE FOR USE IN A MIXING VAT HAVING A BOTTOM SURFACE

(71) Applicant: QUALTECH INC., Quebec (CA)

(72) Inventors: Louis-Simon Falardeau, Quebec (CA); Christian Picard, Quebec (CA)

(73) Assignee: QUALTECH INC., Quebec (CA)

( * ) Notice: Subject to any disclaimer, the term of this patent is extended or adjusted under 35 U.S.C. 154(b) by 475 days.

(21) Appl. No.: 13/681,265

(22) Filed: Nov. 19, 2012

(65) Prior Publication Data

US 2014/0140165 A1    May 22, 2014

(51) Int. Cl.
*B01F 7/00* (2006.01)
*B01F 7/16* (2006.01)
*A23C 19/02* (2006.01)

(52) U.S. Cl.
CPC .............. *B01F 7/001* (2013.01); *B01F 7/165* (2013.01); *A23C 19/02* (2013.01)

(58) Field of Classification Search
CPC .. B01F 7/30; B01F 7/001; B01F 7/165; A61B 17/8825; A23C 19/02
USPC ....................... 366/347, 129, 330.2, 244, 245
See application file for complete search history.

(56) References Cited

U.S. PATENT DOCUMENTS

| | | | | |
|---|---|---|---|---|
| 105,057 | A | * | 7/1870 | Earle ............................... 416/76 |
| 972,727 | A | * | 10/1910 | Stockmann ........... B01F 13/002 366/247 |
| 4,083,653 | A | | 4/1978 | Stiffler |
| 6,113,258 | A | * | 9/2000 | Ardent ................... A47J 36/165 366/282 |
| 6,419,385 | B1 | * | 7/2002 | Walls ..................... B01F 7/1695 366/247 |
| 7,461,967 | B2 | * | 12/2008 | Garcia ................ A47J 43/0755 366/129 |
| 2006/0215484 | A1 | * | 9/2006 | Sokoloff ........................ 366/129 |
| 2012/0080295 | A1 | * | 4/2012 | Stenglein ............ A47J 43/0755 200/50.32 |

FOREIGN PATENT DOCUMENTS

CA          2298879 C        8/2000

* cited by examiner

*Primary Examiner* — Tony G Soohoo
*Assistant Examiner* — Anshu Bhatia
(74) *Attorney, Agent, or Firm* — IP Delta Plus Inc.

(57) ABSTRACT

The present disclosure relates to a stirring blade for attachment to a support plate, and to a combination of a stirring blade and of a support plate, for use in a mixing vat of a mixing apparatus. The support plate is attached to a driving element of the mixing apparatus. The stirring blade has an elongate section for mixing a content of the vat. The stirring blade also defines an aperture for attachment of the stirring blade to the support plate. The aperture is configured so that raising the stirring blade away from the bottom surface of the vat causes an upper surface of the stirring blade to abut on a stop of the support plate, and raising the driving element and the support plate away from the bottom of the vat allows the stirring blade to pivot downward about the support plate for easy removal of the stirring blade.

4 Claims, 8 Drawing Sheets

STIRRING BLADE AND SUPPORT PLATE FOR USE IN A MIXING VAT HAVING A BOTTOM SURFACE

TECHNICAL FIELD

The present disclosure relates to the field of food processing equipment. More specifically, the present disclosure relates to a stirring blade for use in a mixing apparatus comprising a mixing vat with a bottom surface, the mixing apparatus also comprising a driving element having a plate for support of the stirring blade. The present disclosure further relates to a combination comprising the stirring blade and the support plate.

BACKGROUND

Mixing equipment used in the food processing industry, for example in the preparation of curd cheese or of cottage cheese, generally comprise a mixing vat having a large, flat bottom and side walls for containing food products, such as milk. Paddles or blades are used for mixing the products within the mixing vat. These blades are attached to driving equipment that provides mixing motion, for example a circular motion or a lateral motion so that the blades travel on the bottom of the vat in a rotational and/or sweeping movement. Conventionally, the paddles or blades are attached to the driving equipment using taper pins, bolts and nuts or like attachment means.

Blades of a mixing apparatus need to be thoroughly cleaned between each batch being produced. The cleaning requires removing the blades from the support plate. With current stirring blades and support plates, this operation is labor intensive, requires specific tools, and requires downtime of the mixing apparatus, leading to manpower costs and production losses.

Therefore, there is a need for techniques for reducing downtime and labor involved in the cleaning and maintenance of mixing apparatuses.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the cleaning and/or maintenance of mixing apparatuses.

The following terminology is used throughout the present disclosure:

Mixing vat: large container of a mixing apparatus, having side walls and a generally flat bottom.

Stirring blade: a mobile and generally elongate component of the mixing apparatus, sometimes called a mixing blade or mixing paddle.

Driving element: a frame or like structure, usually terminated by an arm and generally motorized, used for providing motion to one or several stirring blade(s).

Support plate: element attached to the arm of the driving element, usually in a permanent manner, for receiving the stirring blade.

Elongate section: part of the stirring blade leading away from the support plate, used for mixing processed materials.

Aperture: an opening within the stirring blade for connecting with the support plate.

Attachment: a physical connection of the stirring blade to the support plate, the connection allowing some pivotal motion of the stirring blade relative to the support plate.

Proximal end: an extremity of the stirring blade having the aperture.

Distal end: an end of the stirring blade opposite from the aperture.

Abut: to touch at a point of contact.

Stop: an element of the support plate for arresting a pivotal motion of the stirring blade.

Notch: indentation of a material of the stirring blade.

Stud: a short protrusion of the support plate.

Unitary: made of a single element.

Recess: a concave indentation of the support plate.

Projection: a protruding section of the support plate.

The present disclosure introduces a stirring blade for attachment to a support plate, and a combination of the stirring blade and of the support plate, for use in a mixing vat of a mixing apparatus having a driving element holding the support plate. The stirring blade is configured for easy installation on the support plate. Removal and replacement of the stirring blade can be performed with minimal downtime of the mixing apparatus.

Figure 1:
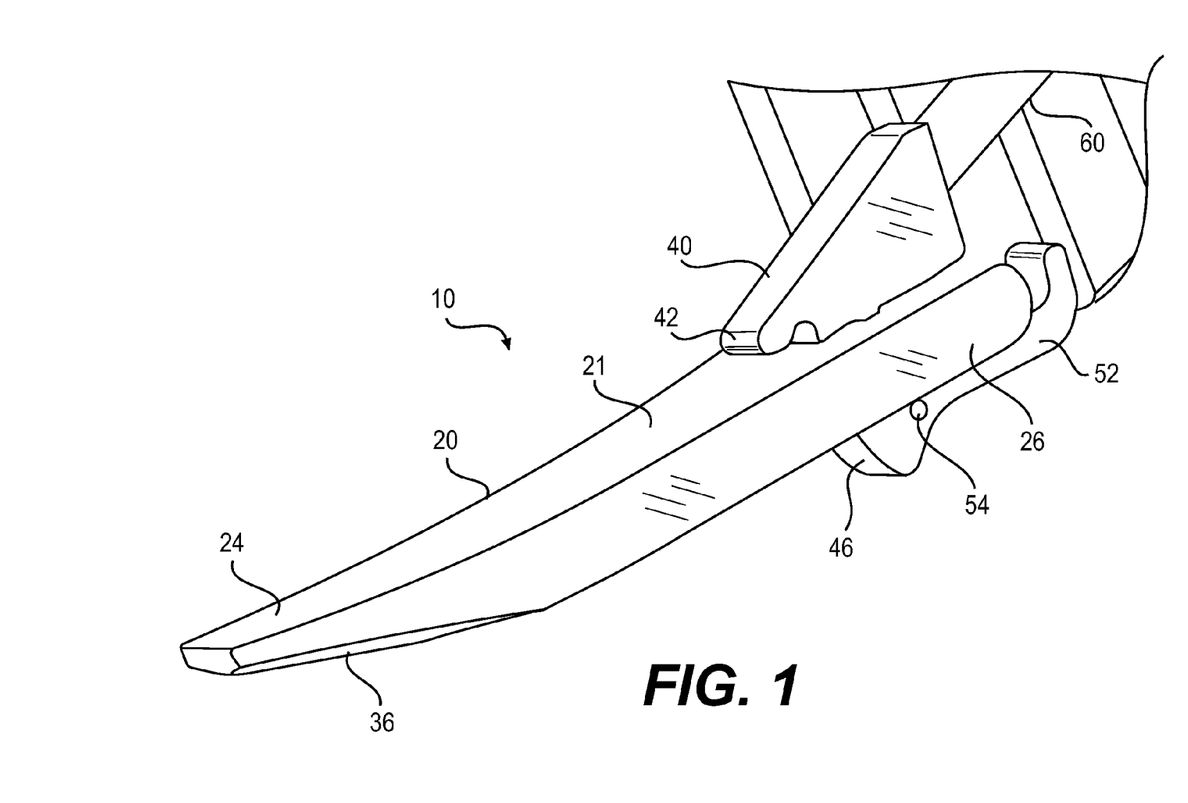
FIG. 1 is a perspective view of a stirring blade and support plate combination.
Figure 2:
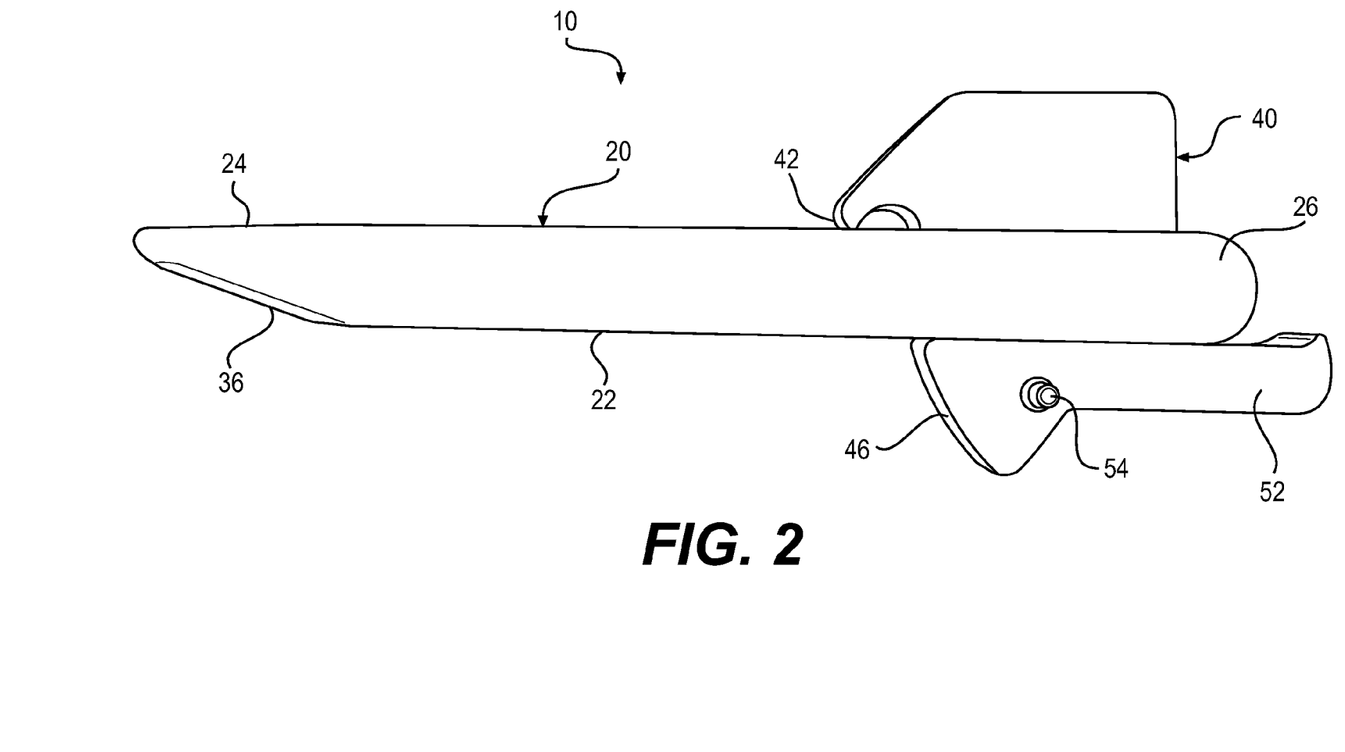
FIG. 2 is a side elevation view of the stirring blade and support plate combination.
Figure 3:
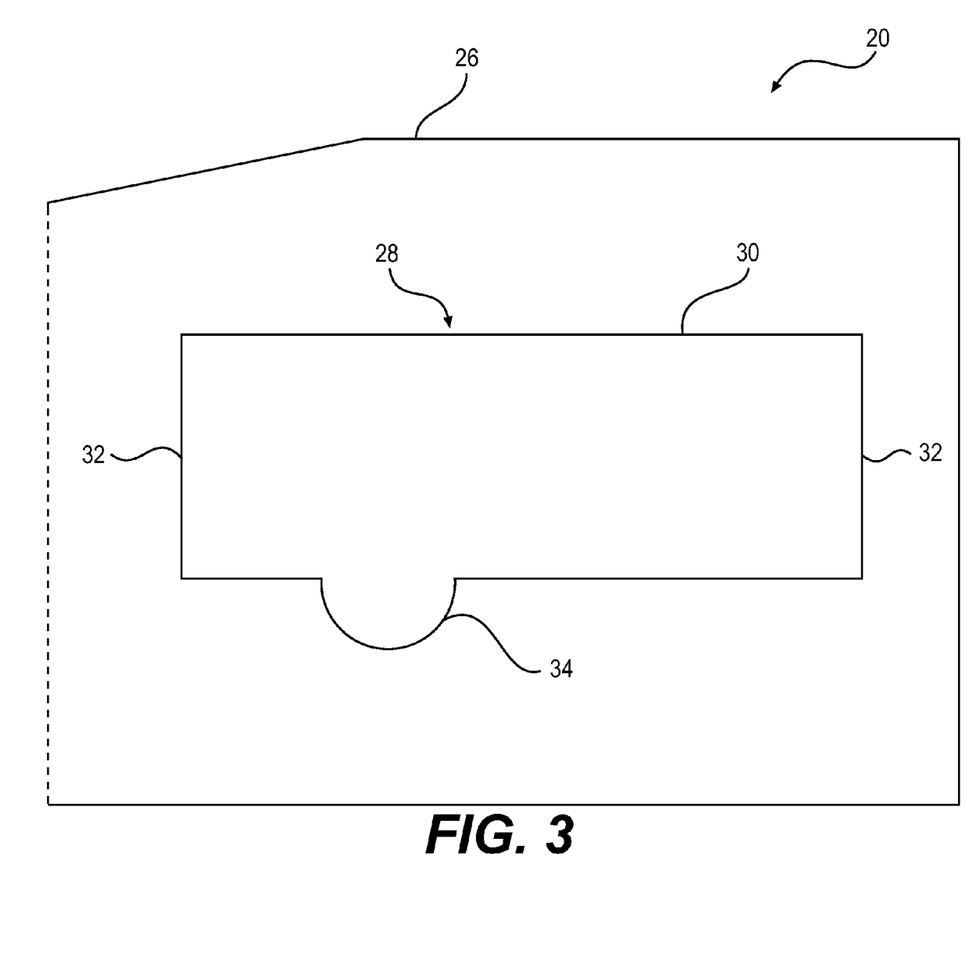
FIG. 3 is a detailed top view of a proximal end of the stirring blade.

Referring now to the drawings, FIG. 1 is a perspective view of a stirring blade and support plate combination. FIG. 2 is a side elevation view of the stirring blade and support plate combination. FIG. 3 is a detailed top view of a proximal end of the stirring blade. Referring at once to FIGS. 1, 2 and 3, a combination 10 comprises a stirring blade 20 and a support plate 40. Materials used for manufacturing of the stirring blade 20 and of the support plate 40 may depend on the application. When the mixing apparatus is used in the food industry, the stirring blade 20 is made of a non-toxic material, including for example various types of plastic materials, such as for example ultra-high molecular-weight polyethylene (UHMW) or similar materials. The support plate 40 is usually made of a rust-resistant metal, for example stainless steel. For other applications, various plastics or metals may be used as appropriate. Those of ordinary skill in the art are already familiar with proper material selection for use in mixing apparatuses.

The combination 10 may be mounted on a mixing apparatus (shown in parts on later Figures) by attachment of the support plate 40 to an arm 60, the arm 60 itself being part of a driving element (shown on later Figures) of the mixing apparatus. The mixing apparatus may comprise one or more combinations 10, depending on the needs of an application. The stirring blade 20 has an upper surface 21 and comprises an elongate section 22 terminated by a distal end 24 having a flat lower surface 36. A proximal end 26 of the stirring blade 20 defines an aperture 28 having a length 30 and a width 32. The aperture 28 may further comprise a notch 34 on one of its sides.

Figure 4:
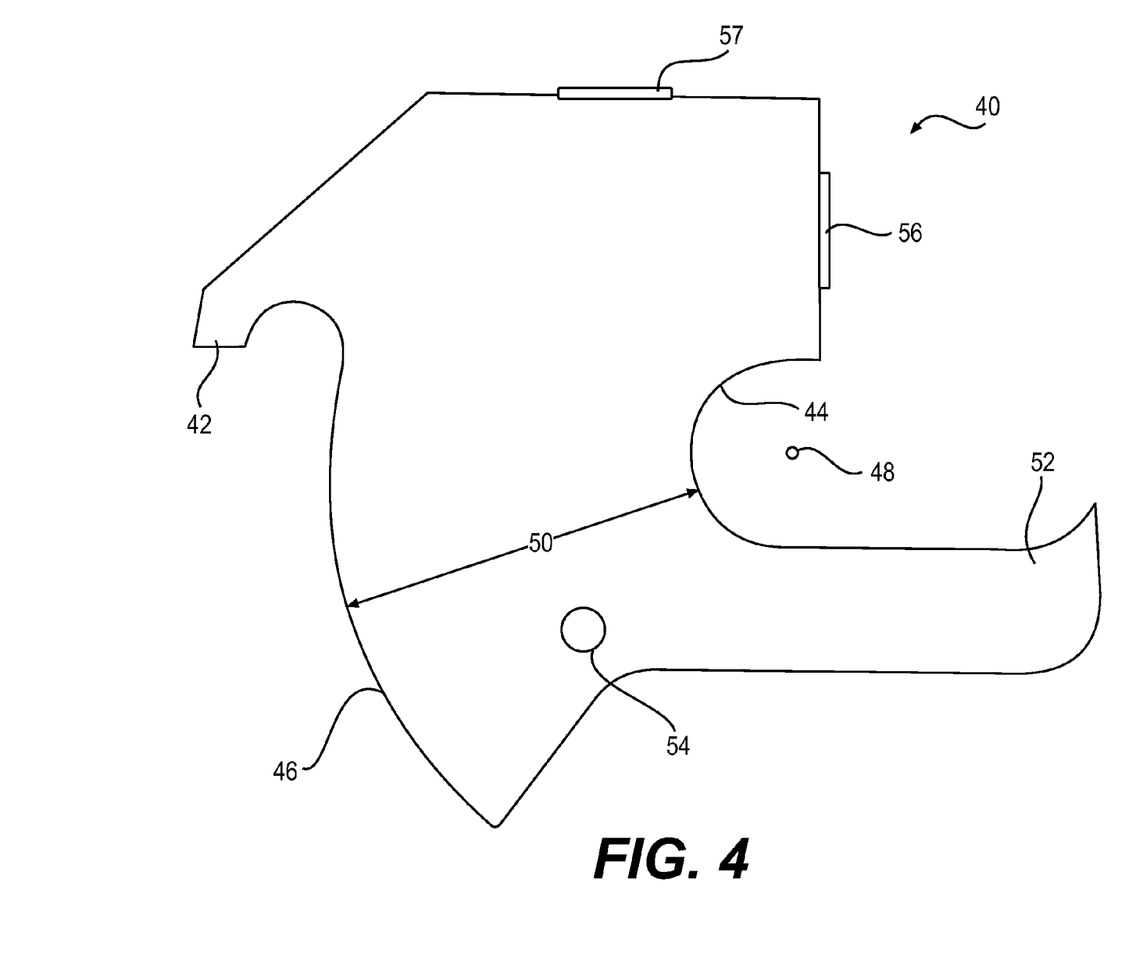
FIG. 4 is a detailed side elevation view of the support plate.

FIG. 4 is a detailed side elevation view of the support plate. Referring at once to FIGS. 1, 2 and 4, the support plate 40 has a stop 42 located near a convex face 46 that forms a front face of the support plate 40. The convex face 46 shares an imaginary axis 48 with a curved recess 44 on an opposite, back side of the support plate 40. The convex face 46 and the curved recess 44 are therefore substantially concentric. The curved recess 44 and of the convex face 46 are separated by a diameter difference 50. The support plate 40 further comprise a projection 52 and a stud 54 that, as will be explained in more details below, is made to match the notch 34 of the stirring blade 20. The support plate 40 has an attachment point 56 or 57 configured for attachment to the arm 60 of the driving element. The attachment point 56 or 57 may comprise a filleted internal aperture (not shown) for screwing the support plate 40 on a filleted extremity (not shown) of the arm 60. Alternatively, attachment of the support plate 40 to the driving element via the arm 60 may be made permanent, as the support plate 40 may be welded at the attachment point 56 or 57 to the arm 60. Those of ordinary skill in the art will easily envision other practical manners of attaching the support plate to the arm 60.

The stirring blade 20 is configured for use in a mixing vat of a mixing apparatus, the vat having a generally flat bottom surface, the mixing apparatus also having a driving element. The support plate 40 operably connects the stirring blade 20 to the driving element. The elongate section 22 and distal end 24 of the stirring blade 20 are configured for mixing a content of the mixing vat, for example by a rotational and/or lateral sweeping movement of the stirring blade 20. The aperture 28 at the proximal end 26 of the stirring blade 20 is configured for attachment to the support plate 40. The stirring blade 20 may be mounted to the support plate 40 by first inserting the projection 52 within the aperture 28 and then pivoting the stirring blade 20 on the support plate 40 until the upper surface 21 of the stirring blade 20 abuts on the stop 42 of the support plate 40. Before pivoting the stirring blade 20 about the support plate 40, an operator may temporarily leave the stirring blade 20 hanging on the projection 52, allowing for example installation of other stirring blades 20 on other support plates 40 of the mixing apparatus. The length 30 of the aperture 28 is configured to substantially match the diameter difference 50 in order to facilitate mounting of the stirring blade 20 on the support plate 40. In a first variant, the length 30 and the diameter distance 50 may be configured for free pivotal movement of the stirring blade 20 on the support plate 40. In a second variant, the length 30 and the diameter distance 50 may be configured for slight frictional movement of the stirring blade 20. Those of ordinary skill in the art will readily be able to select dimensions of the length 30 and of the diameter distance 50 based on a trade-off between ease of installation of the stirring blade 20 and premature wear of the stirring blade 20 that may occur in case of excessive play between the support plate 40 and the aperture 28.

Figure 5:
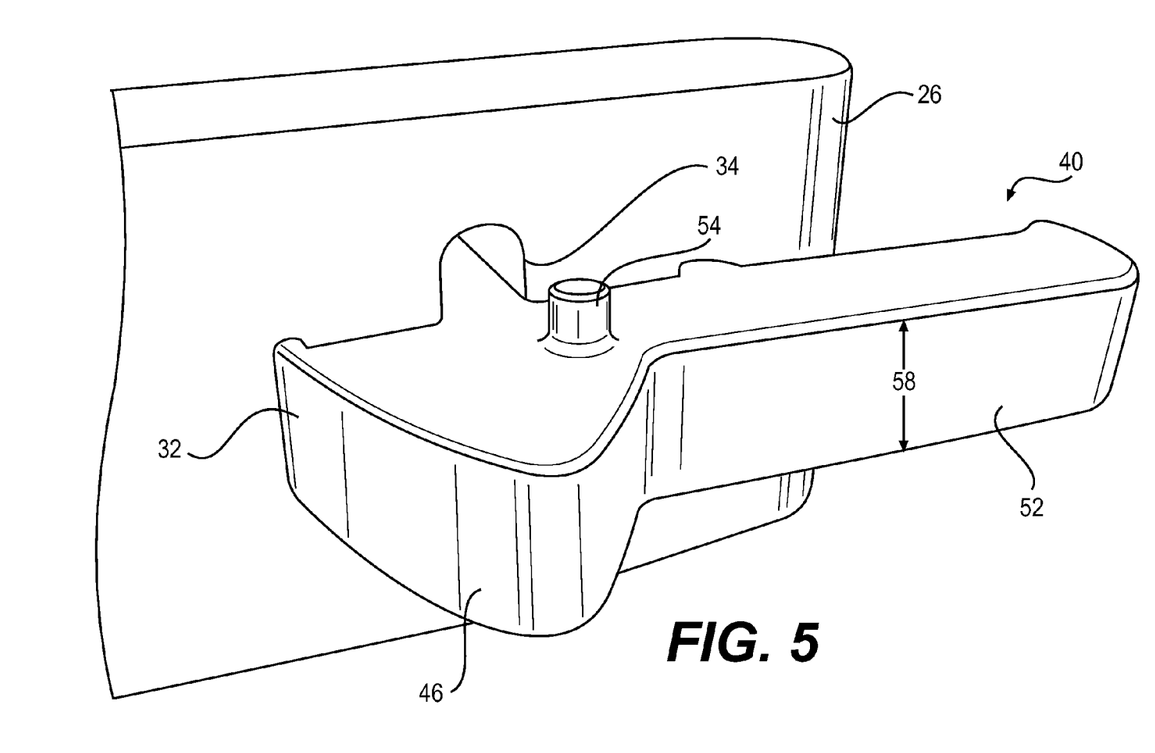
FIG. 5 is a detailed view of the stirring blade and support plate combination as seen in a lower perspective view.

Reference is now made to FIG. 5, which is a detailed view of the stirring blade and support plate combination as seen in a lower perspective view. FIG. 5 shows a relationship between the width 32 of the aperture 28 and a thickness 58 of the support plate 40. These two dimensions are also matched to allow mounting of the stirring blade 20 on the support plate 40 and may further be configured for free pivotal movement or for slight frictional pivotal movement of the stirring blade 20 on the support plate 40.

In an embodiment, the support plate 40 comprises the stud 54 and the aperture 28 comprises the notch 34. As can be observed on FIG. 5, insertion of the stirring blade 20 on the support plate 40 is made possible in the presence of the stud 54 by the fact that the notch 34 is made to mate with the stud 54 so that the stud 54 does not impede rotation of the stirring blade 20. In any case where an operator would attempt to install the stirring blade 20 in an upside down position on the support plate 40, the stud 54 would prevent full insertion of the stirring blade 20 on the support plate 40 since the notch 34 would appear on a side of the support plate 40 opposite from the stud 54.

The aperture 28 is configured to allow downward pivoting of the stirring blade 20, either freely or frictionally, about the support plate 40. In preparation for operation of the mixing apparatus, after mounting of the stirring blade 20 on the support plate 40, the driving element and the arm 60 are lowered near a bottom surface of the mixing vat and the flat lower surface 36 of the stirring blade 20 rests on the bottom surface of the mixing vat. As the mixing apparatus is in operation, the driving element causes a lateral or rotational movement of the stirring blade 20. As obstacles are encountered, the distal end 24 of the stirring blade 20 may be pushed upwards. Some upward motion of the distal end 24 of the stirring blade 20 may be allowed by a configuration of the combination 10 leaving some space between the stop 42 of the support plate 40 and the upper surface 21 of the stirring blade 20. Beyond a configured amount, any motion raising the stirring blade 20 away from the bottom surface of the vat causes abutment of the upper surface 21 of the stirring blade 20 to the stop 42 of the support plate 40.

Removal of the stirring blade 20 between each batch being produced is required for sanitary purposes. For cleaning or replacement of the stirring blade 20, when the driving element is raised away from the bottom surface of the mixing vat, the aperture 28 allows the stirring blade 20 to pivot downward about the support plate 40 so that the distal end 24 of the stirring blade 20 is lowered. The stirring blade 20 may then easily slide over the projection 52 and be released from the support plate 40. Removal of the stirring blade 20 allows its thorough cleaning.

Figure 6:
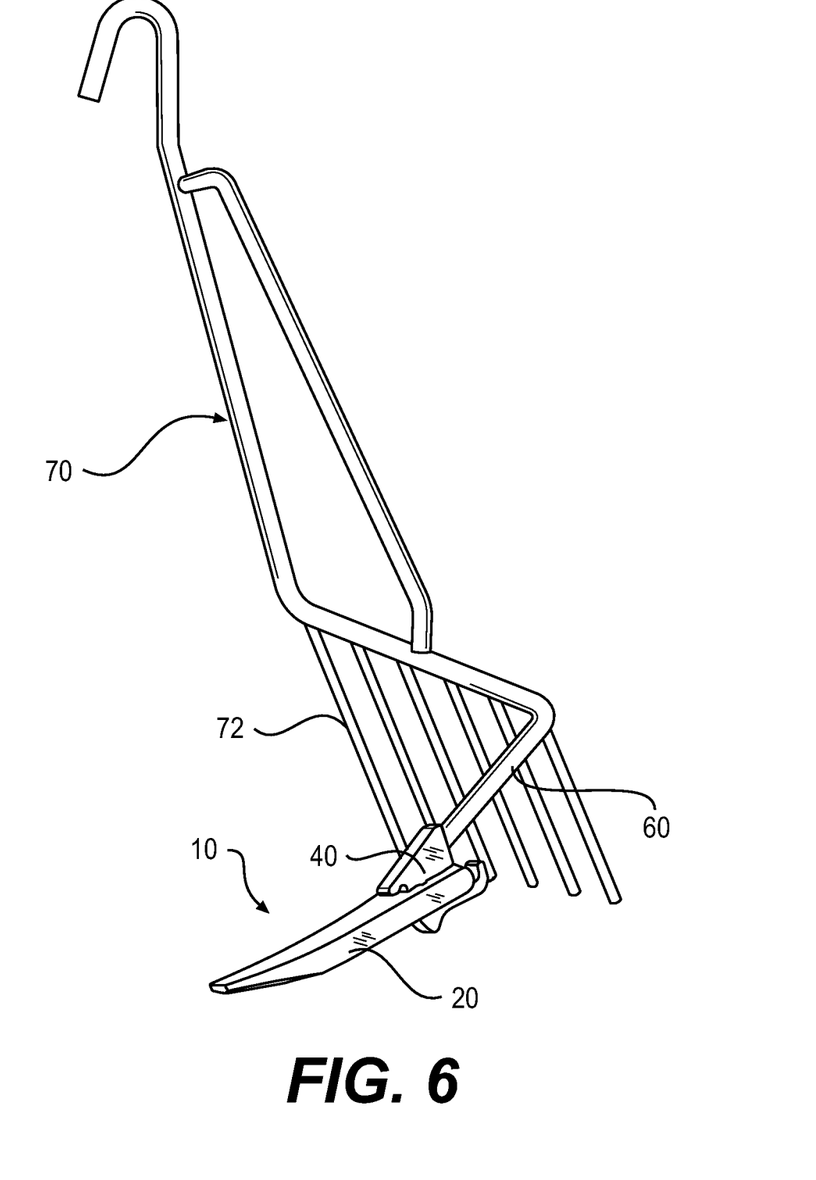
FIG. 6 is a perspective view of an example configuration of the combination of FIG. 1 mounted on a driving element.

FIG. 6 is a perspective view of an example configuration of the combination of FIG. 1 mounted on a driving element. The arm 60 is, in this example configuration, an integral part of a driving element 70. Mounting of the driving element 70 to the mixing apparatus, for example to a motorized drive (not shown) of the mixing apparatus, involves routine operation by the skilled worker. The example configuration comprises a plurality of fork elements 72, used for mixing cheese curds, these fork elements 72 may or may not be present in various actual implementations of the mixing apparatus.

Figure 7:
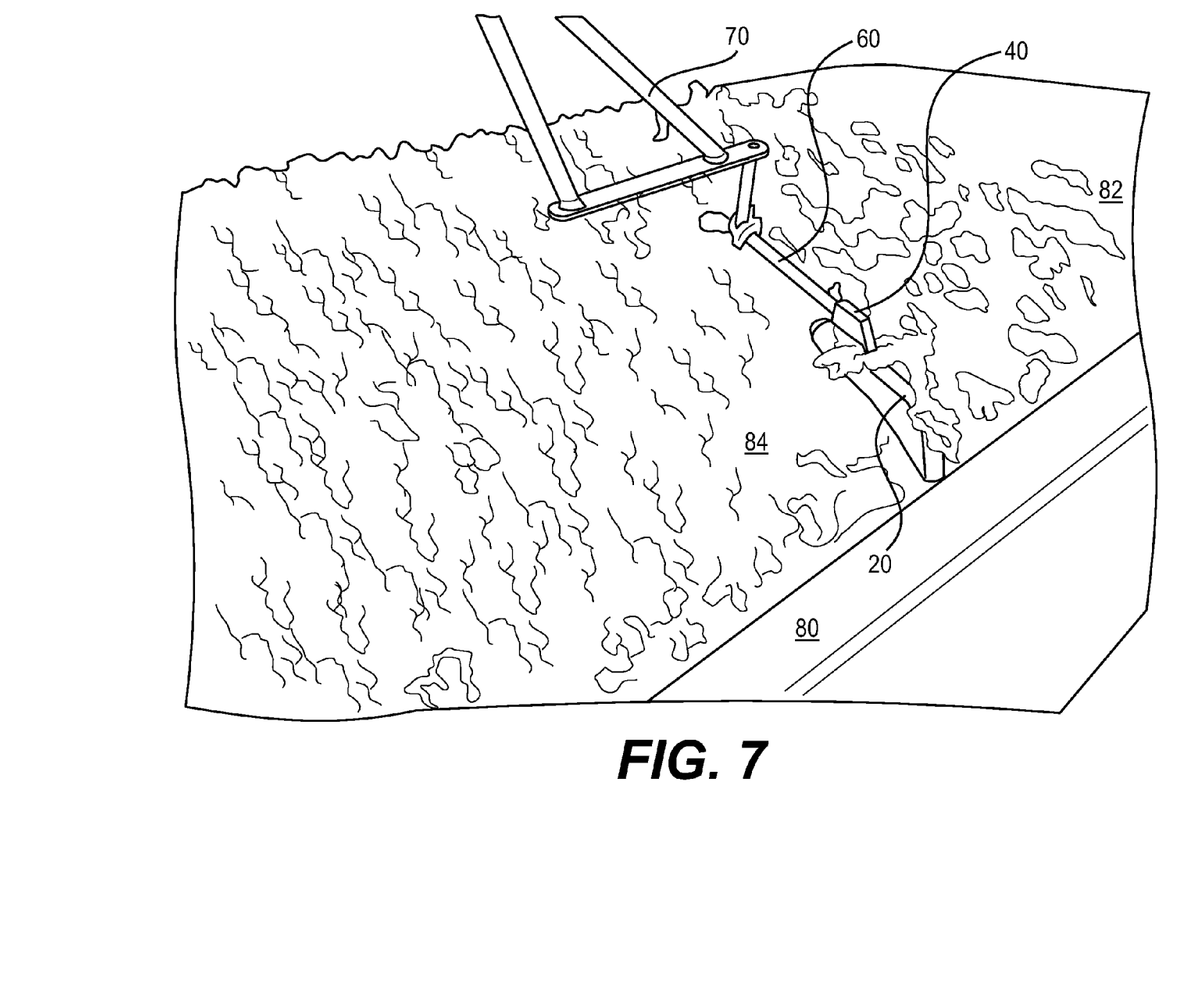
FIG. 7 is an illustration of an example use of the stirring blade and support plate combination.

FIG. 7 is an illustration of an example use of the stirring blade and support plate combination. A mixing vat 80 has a bottom surface 82 and holds cheese curds 84 or cottage cheese 84 being processed by the mixing apparatus. The stirring blade 20 rests on the bottom surface 82, being held to the driving element 70 via the support plate 40, which is attached to the arm 60. The driving element 70 drives the stirring blade 20 in a circular sweeping movement around the bottom surface 82. The driving element 70 may also move longitudinally along a length of the mixing vat 80 so that the stirring blade 20 may sweep the entire bottom surface 82. A single driving element 70 may hold one or more combinations 10 and the mixing apparatus may comprise one or more driving elements 70.

Figure 8:
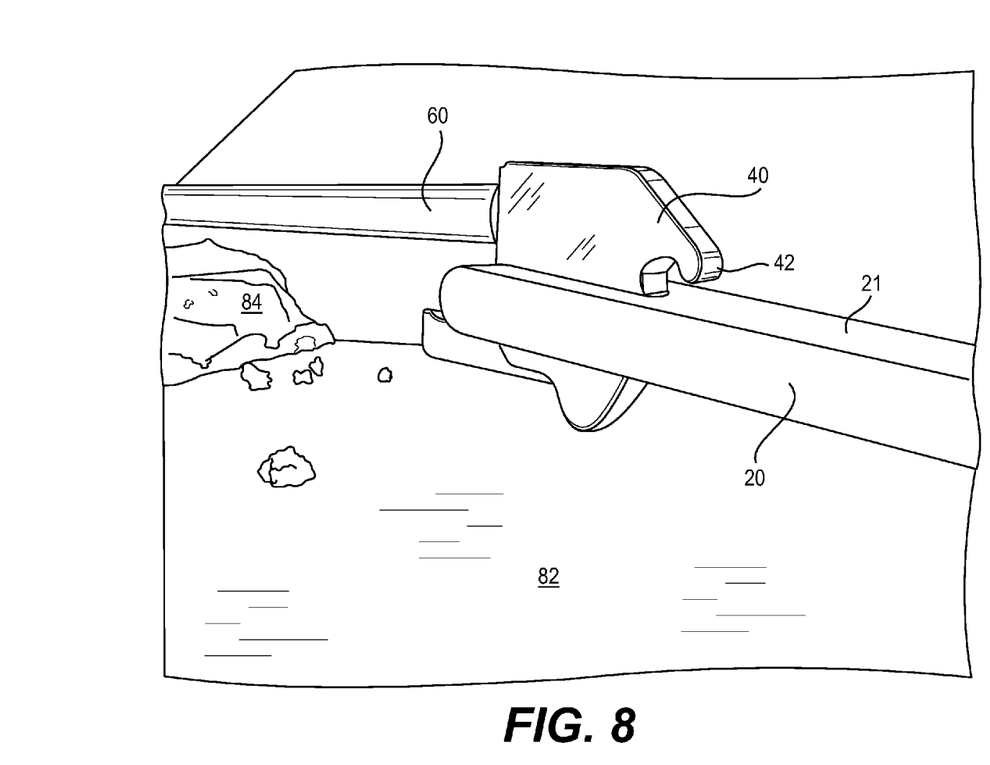
FIG. 8 is a detailed perspective view of the stirring blade and support plate in operation.

FIG. 8 is a detailed perspective view of the stirring blade and support plate in operation. The flat lower surface 36 (visible on earlier Figures) of the stirring blade 20 rests on the bottom surface 82 of the mixing vat 80. Some space is visible between the upper surface 21 of the stirring blade 20 and the stop 42 of the support plate 40. This space is determined in part by a geometry of the stirring blade 20 and of the support plate 40, and in part by an overall height of the arm 60 and driving element 70 above the bottom surface 82. As the stirring blade 20 starts cutting into the raw material 84, it may undergo some modest amount of up and down movement while remaining solidly attached to the support plate.

Though the above embodiments have been described in relation to a mixing apparatus used for preparation of cheese curds or cottage cheese, those of ordinary skill in the art will appreciate that the disclosed stirring blade and combination may also be applied to other types of food processing applications, or to other applications that are not necessarily related to the food industry. As a non-limiting example, the disclosed stirring blade and support plate combination may be used in a mixing apparatus intended for processing of petroleum products, chemical products, mixed cement or concrete, slurries, granules, and the like, insofar as the equipment has a generally flat bottom and a raisable driving element.

Those of ordinary skill in the art will realize that the description of the stirring blade and combination for use a mixing apparatus are illustrative only and are not intended to be in any way limiting. Other embodiments will readily suggest themselves to such persons with ordinary skill in the art having the benefit of the present disclosure. Furthermore, the disclosed stirring blade and support plate combination may be customized to offer valuable solutions to existing needs and problems of downtime and labor involved in the maintenance of mixing apparatuses.

In the interest of clarity, not all of the routine features of the implementations of the stirring blade and of the combination are shown and described. It will, of course, be appreciated that in the development of any such actual implementation of the stirring blade and of the combination, numerous implementation-specific decisions may need to be made in order to achieve the developer's specific goals, such as compliance with application-related and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of food processing equipment having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A mixing apparatus comprising:
 a driving element having an arm;
 a mixing vat having a bottom surface placed below the driving element;
 a stirring blade comprising:
  an elongate section configured for mixing a content of the mixing vat, the elongate section defining an upper surface and a lower surface, the elongate section being terminated by a flat lower surface; and
  a proximal end defining an aperture, the aperture having a substantially rectangular shape;
 a support plate attached to the arm of the driving element, the support plate comprising a curved recess terminated by a projection and an opposite convex face terminated by a stop, the curved recess and the convex face being substantially concentric;
 whereby in operation, the projection of the support plate is inserted into the aperture of the stirring blade in one of the following: free pivotal movement of the stirring blade on the support plate and slight frictional pivotal movement of the stirring blade on the support plate, the support plate allowing downward pivoting of the stirring blade about the support plate when the driving element is raised away from the bottom surface of the mixing vat to allow release of the stirring blade from the support plate.

2. The mixing apparatus of claim 1, wherein the curved recess and the convex face of the support plate allow rotation of the stirring blade away from the stop of the support plate.

3. The mixing apparatus of claim 1, wherein:
 the support plate comprises a side stud; and
 the aperture of the stirring blade comprises a side notch configured to allow attachment of the stirring blade to the support plate in the presence of the side stud on the support plate.

4. The mixing apparatus of claim 1, wherein the support plate is configured for permanent attachment to the driving element of the mixing apparatus.

* * * * *